US007685725B2

(12) United States Patent
Rodriguez et al.

(10) Patent No.: US 7,685,725 B2
(45) Date of Patent: Mar. 30, 2010

(54) APPARATUS AND METHOD FOR THEODOLITE SUPPORT

(75) Inventors: Samuel J. Rodriguez, Chula Vista, CA (US); David A. Zion, Bonaire, GA (US); Kris W. Wallace, Alpine, CA (US)

(73) Assignee: Raytheon Company, Waltham, MA (US)

( * ) Notice: Subject to any disclaimer, the term of this patent is extended or adjusted under 35 U.S.C. 154(b) by 128 days.

(21) Appl. No.: 11/936,512

(22) Filed: Nov. 7, 2007

(65) Prior Publication Data
US 2009/0113732 A1     May 7, 2009

Related U.S. Application Data

(60) Provisional application No. 60/985,016, filed on Nov. 2, 2007.

(51) Int. Cl.
   G01C 15/00    (2006.01)
   G01C 1/02     (2006.01)
(52) U.S. Cl. ............................ 33/296; 33/299; 33/290; 343/894; 343/760
(58) Field of Classification Search ............... 33/281, 33/286, 290, 296, 299, 613, 645, 347; 343/760, 343/894; 342/359; 248/514, 515, 521, 539
See application file for complete search history.

(56) References Cited

U.S. PATENT DOCUMENTS

| 2,549,244 | A | * | 4/1951 | Schuett ..................... 33/299 |
| 2,683,011 | A | | 7/1954 | Haggerty .................... 248/122 |
| 3,106,782 | A | | 10/1963 | Carroll, Jr. .................... 33/174 |
| 5,626,320 | A | * | 5/1997 | Burrell et al. ............. 248/230.6 |
| 6,031,508 | A | * | 2/2000 | Ishizuka et al. ............. 343/882 |
| 6,480,172 | B1 | * | 11/2002 | Sawyer ........................ 343/890 |
| 6,664,937 | B2 | * | 12/2003 | Vermette et al. ............ 343/892 |
| 6,709,184 | B1 | * | 3/2004 | McDonald ................... 403/98 |
| 6,768,474 | B2 | * | 7/2004 | Hunt ........................... 343/892 |
| 6,956,526 | B1 | * | 10/2005 | Lundstedt et al. ........... 342/359 |
| 7,180,471 | B2 | * | 2/2007 | Boucher ..................... 343/890 |
| 7,501,993 | B2 | * | 3/2009 | Boucher ..................... 343/890 |

FOREIGN PATENT DOCUMENTS

SU         491 307        6/1978

OTHER PUBLICATIONS

PCT Notification of Transmittal of the International Search Report and the Written Opinion of the International Searching Authority, or the Declaration, mailed Feb. 16, 2009, in re PCT/US2008/081251 (14 pages), Feb. 16, 2009.

* cited by examiner

*Primary Examiner*—Amy Cohen Johnson
(74) *Attorney, Agent, or Firm*—Baker Botts L.L.P.

(57) ABSTRACT

A theodolite support tool includes a base plate configured to couple to the theodolite. The base plate has at least three rods extending from the bottom side of the base plate with each rod being vertically adjustable. The theodolite support tool also includes a clamp configured to attach to a support of an antenna. A cantilevered frame supports the base plate and is coupled to the clamp such that the frame is approximately level when the clamp is attached to the support of the antenna that is a predetermined angle from vertical.

21 Claims, 4 Drawing Sheets

APPARATUS AND METHOD FOR THEODOLITE SUPPORT

RELATED APPLICATIONS

This application claims the benefit of U.S. Provisional Application Ser. No. 60/985,016, filed Nov. 2, 2007, entitled Apparatus and Method for Theodolite Support, which is hereby incorporated by reference.

TECHNICAL FIELD

The present invention relates generally to radar antenna systems, and more particularly to a method and apparatus for supporting a theodolite used in radar antenna calibration.

BACKGROUND

Radar systems provide air traffic control personnel with accurate navigational information to allow them to guide aircraft on approach to a safe landing, during both clear and instrument flight rule weather conditions. Radar systems are composed of the radar and associated communications and electronics equipment and external antenna systems. Radar systems detect and track aircraft approaching a runway for landing and may be deployed as mobile radar systems.

The external antenna system of a radar system requires careful and precise positioning for the radar to perform its function. During installation all antennas require a bore site adjustment of the antenna reflectors so they reflect at a predetermined elevation and distance from the antenna. This bore site adjustment is achieved with reference reflectors that are positioned once an antenna site survey has been completed. The positioning of the reference reflector and adjustment of the antenna reflector may require angle offset calculations. These offset calculations are required using conventional techniques because the surveyor can only position his tripod on the ground near the antenna. In most cases, the surveying equipment will be positioned at a lower elevation than the antenna target points.

Surveying may be done with the help of a theodolite. A theodolite is an instrument for measuring both horizontal and vertical angles, as used in triangulation networks. A modern theodolite consists of a telescope mounted movably within two perpendicular axes, the horizontal or trunnion axis, and the vertical axis. When the telescope is pointed at a desired object, the angle of each of these axes can be measured with great precision, typically on the scale of arc seconds. A transit is a specialized type of theodolite that is able to "flop over" ("transit the scope") to allow easy back-siting and double of angles for error reduction.

Using the theodolite, a survey team may direct a reference reflector crew in positioning a reference reflector at the proper elevation required for bore siting the antenna.

Using conventional techniques, it is often necessary for installation and calibration teams to double check the position of the reference reflector due to incorrect survey calculations. Incorrect survey calculations may be caused by the angle offset calculations that must be performed if the theodolite is positioned at a lower elevation than the antenna target points.

SUMMARY

In accordance with a particular embodiment of the present invention, a theodolite support tool includes a base plate configured to couple to the theodolite. The base plate has at least three rods extending from the bottom side of the base plate with each rod being vertically adjustable. The theodolite support tool also includes a clamp configured to attach to a support of an antenna. A cantilevered frame supports the base plate and is coupled to the clamp such that the frame is approximately level when the clamp is attached to the support of the antenna that is a predetermined angle from vertical.

A method for positioning a theodolite includes clamping a theodolite support tool to a support of an antenna is also disclosed. The theodolite support tool includes a base plate that has at least three rods extending from its bottom side. Each respective rod is vertically adjustable. The theodolite support tool also includes a clamp configured to attach to the support of the antenna, and a cantilevered frame supporting the base plate and being coupled to the clamp. The theodolite is secured to the base plate of the theodolite support tool, and the position of the base plate is adjusted. A lens of the theodolite may be positioned a predetermined height above a reflector tip of the antenna.

In accordance with a further embodiment of the present invention, a method for calibrating an antenna includes mounting a theodolite support tool having a vertically adjustable base plate to an antenna. The height of the theodolite support tool and the base plate may be separately adjusted to allow a horizontal line of sight of a theodolite to be a predetermined height above a reflector tip of the antenna. A target reflector is positioned using the theodolite, and an antenna reflector of the antenna is adjusted.

Technical advantages of particular embodiments of the present invention include the ability to position a theodolite at a specific height above a reflector tip of an antenna. The height may be selected such that a reference reflector may be positioned without the need for a vertical offset calculation.

Further technical advantages of particular embodiments of the present invention include a theodolite support tool that is easily attached to and removed from a support of an antenna. The theodolite support tool may also be attached to an internal support allowing for improved precision in positioning of a reference reflector with respect to an antenna.

Still further technical advantages of particular embodiments of the present invention include the ability to adjust the base plate on which a theodolite sits to be roughly level. This rough leveling can compliment the precise leveling system internal to the theodolite.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete understanding of embodiments of the invention will be apparent from the detailed description taken in conjunction with the accompanying drawings in which.

DETAILED DESCRIPTION

Example embodiments of the present invention and their advantages are best understood by referring to FIGS. 1A through 4 of the drawings.

Figure 1A:
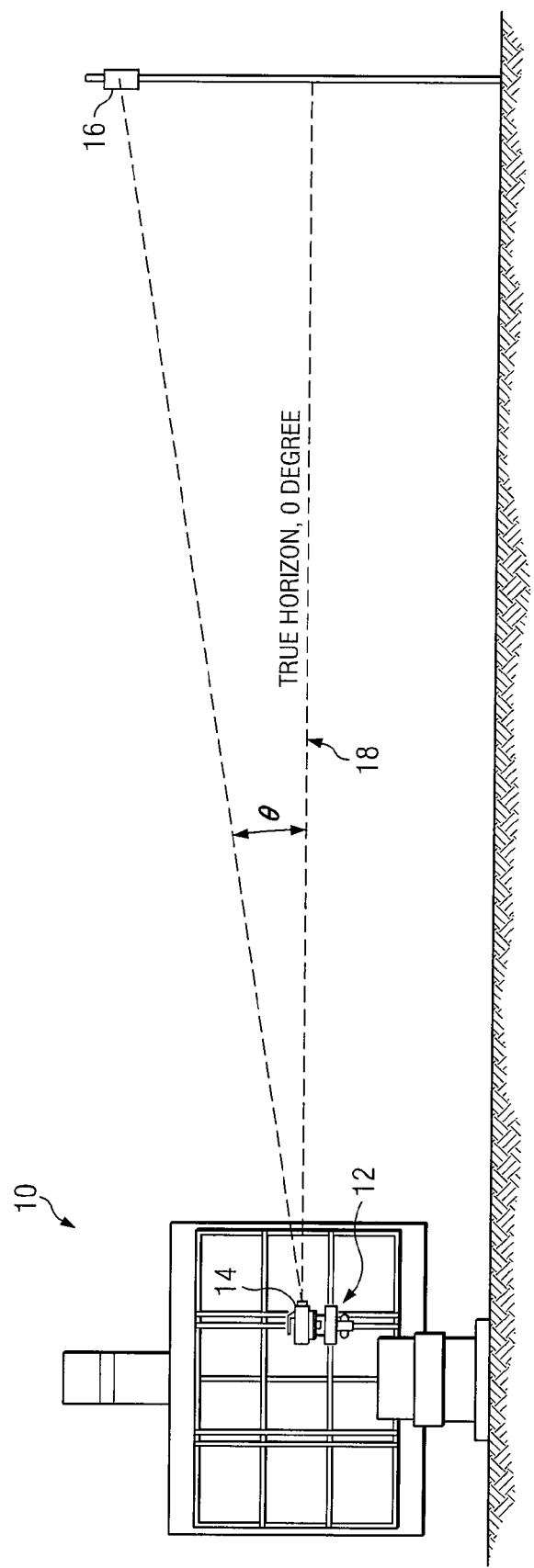
FIG. 1A illustrates the calibration of a radar antenna in accordance with an embodiment of the present invention.
Figure 1B:
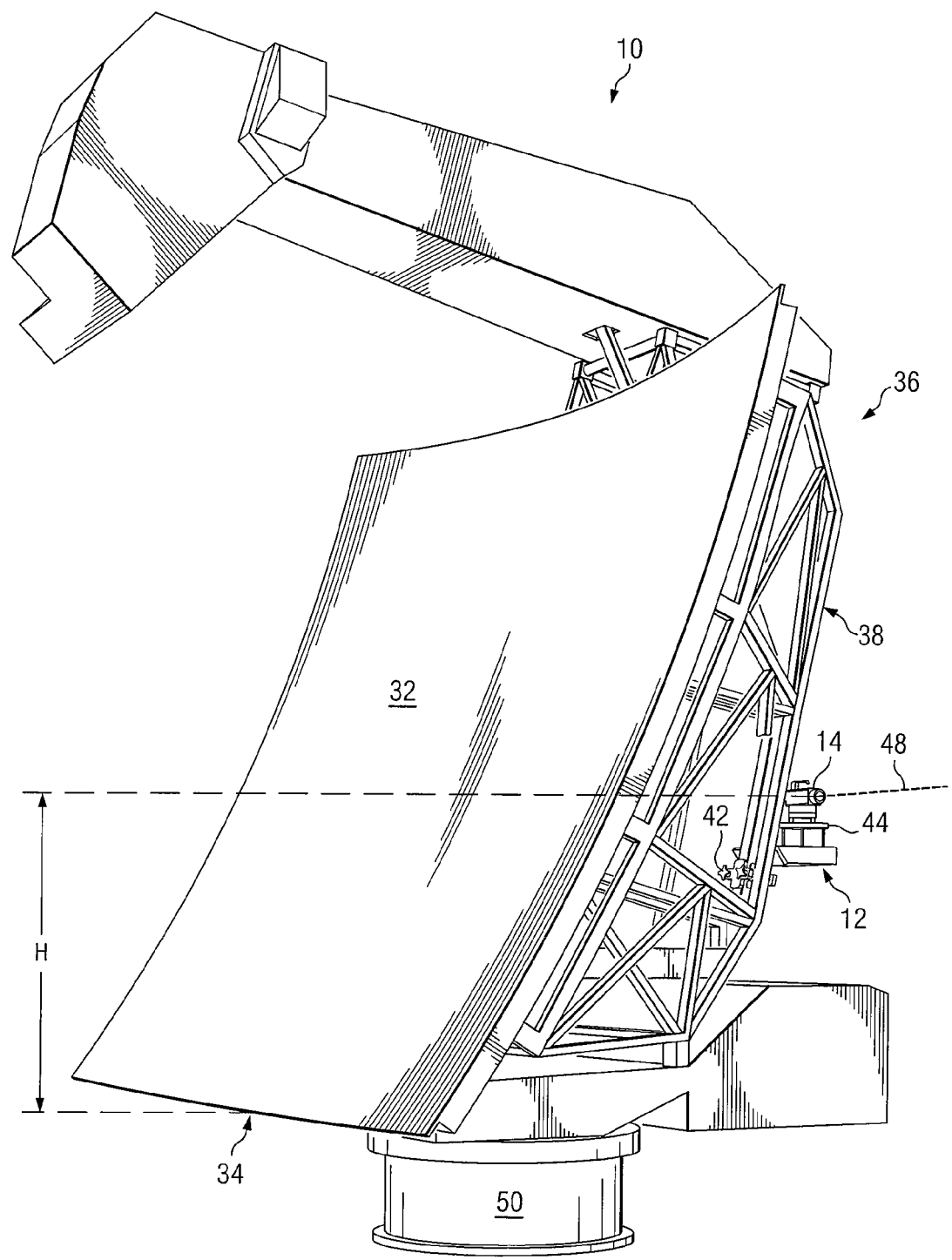
FIG. 1B illustrates the positioning of a theodolite support tool on an antenna in accordance with a particular embodiment of the present invention.

FIGS. 1A and 1B illustrate a radar antenna 10 in position for calibration. Antenna 10 may be a GPN-22 radar antenna manufactured by Raytheon Company, for example, or any other suitable antenna. Antenna 10 may be positioned near an airplane runway to provide air traffic control to aircraft landing on that runway. As part of the installation or maintenance calibration of antenna 10, a bore site adjustment of the antenna reflector is performed. In accordance with a particular embodiment of the present invention, a theodolite support tool 12 may be used to position a theodolite 14 at a proper height above the reflector tip of antenna 10. In this location, theodolite 14 may be used to locate and properly position a reference reflector 16 at a certain distance and elevation relative to antenna 10. Reference reflector 16 may be positioned such that an imaginary line from reference reflector 16 to theodolite 14 is an angle θ above true horizon 18.

When theodolite support tool 12 is clamped to the backstructure of antenna 10, theodolite 14 may be located at the required height above the reflector tip of antenna 10. Without theodolite support tool 12, the conventional procedure for bore siting and antenna may involve a theodolite attached to a tripod. The tripod would have to be positioned away from the antenna and may not allow the theodolite to reach the proper height above the reflector tip of the antenna. This offset height measurement must be factored into equations to calculate the proper positioning of the reference reflector 16 with respect to antenna 10.

Antenna 10 may rotate on its base 50 to allow positioning of theodolite 14 that is mounted to theodolite support tool 12 which is clamped to the backstructure of antenna 10. By positioning theodolite 14 at a particular height, theodolite support tool 12 may eliminate additional calculations and simplify installation and maintenance calibration of antenna 10.

Referring to FIG. 1B, antenna 10 includes reflector 32. At the base of reflector 32 is reflector tip 34. Reflector 32 and other components that are required for the operation of antenna 10 and the radar system of which it is a part, may be supported by backstructure 36. Backstructure 36 may include multiple backstructure tubes 38 that are constructed and positioned to provide support for antenna 10. Antenna 10 may rotate on its antenna base 50.

Theodolite support tool 12 with theodolite 14 mounted on it is shown in a cantilevered position clamped to backstructure 36. In particular, theodolite support tool 12 is shown clamped to a backstructure tube 38 that runs approximately vertical and is located on the perimeter of backstructure 36. Clamp 42 of theodolite support tool 12 may be configured such that base plate 44 of theodolite support tool 12 may be approximately horizontal when clamp 42 is attached to backstructure tube 38. Clamp 42 is not limited to attachment as illustrated, but rather than be attached to any vertical backstructure tube 38.

Theodolite support tool 12 may be clamped to the backstructure at various points along the length of vertical backstructure tube 38. In particular embodiments of the present invention, theodolite support tool 12 may be attached to backstructure 36 at a height that would position theodolite 14 a certain height above reflector tip 34 of antenna 10. In particular embodiments, a horizontal line of sight of theodolite 14 through the eyepiece of theodolite 14 may be a height H above reflector tip 34, which may be approximately sixty inches, in one embodiment. Base plate 44 of theodolite support tool 12 may be vertically adjustable along three threaded rods to allow base plate 44 to be horizontal even if theodolite support tool 12 is slightly off horizontal. The threaded rods allow for fine adjustment of the height and level of base plate 44. Theodolite 14 may include even finer height and level adjustments to ensure horizontal line of sight 48 is precisely horizontal.

Figure 2:
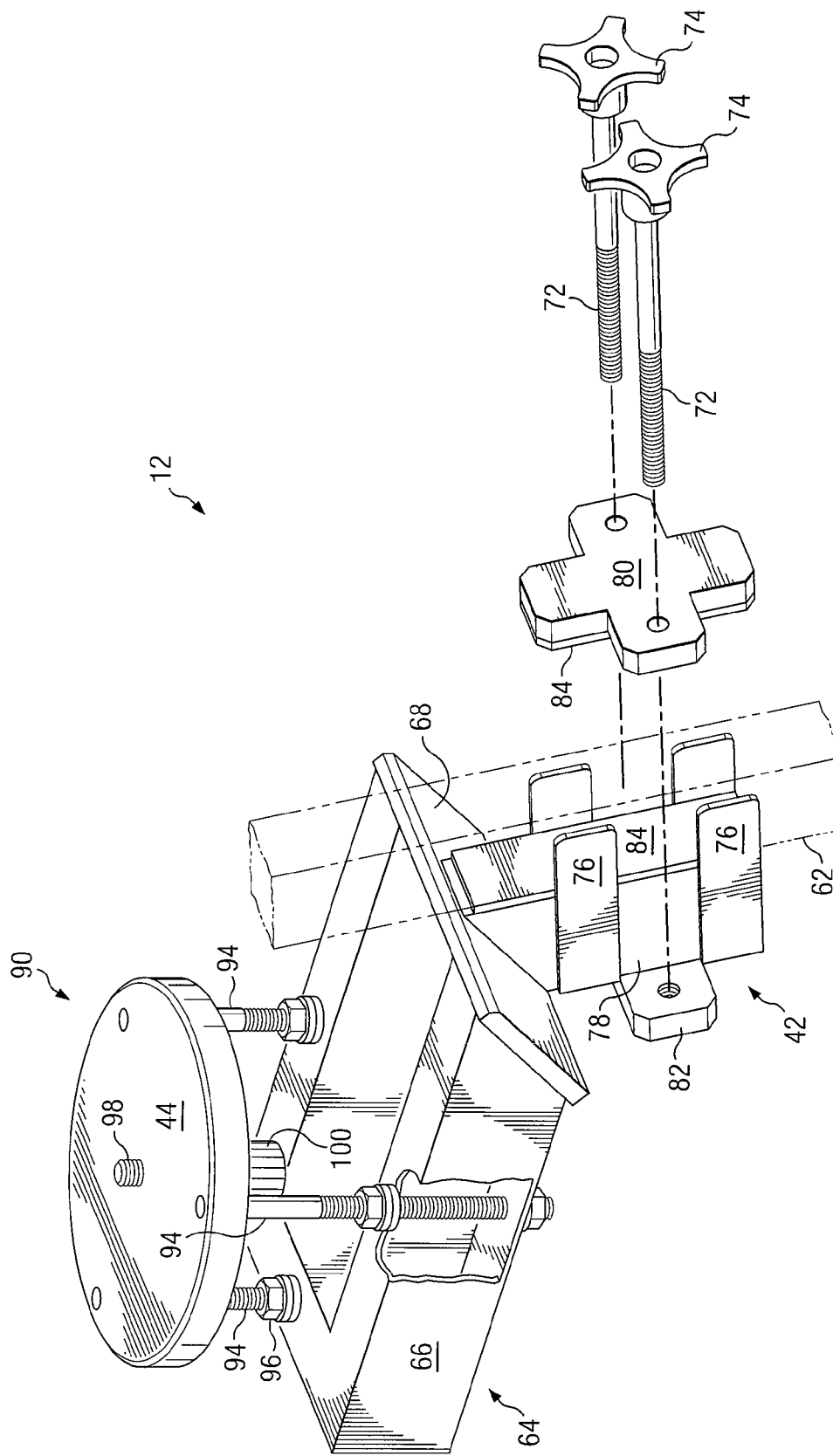
FIG. 2 is an isometric view of a theodolite support tool in accordance with a particular embodiment of the present invention.

FIG. 2 illustrates theodolite support tool 12 in accordance with a particular embodiment of the present invention. Theodolite support tool 12 includes frame 64, clamp assembly 42, and base/mounting plate assembly 90.

Frame 64 may be constructed with three frame members 66, each frame member being aluminum tube. Frame members 66 are welded together to form a generally rectangular frame 64. Each frame member may be composed of aluminum tube that may be 3 inches by 2 inches and ⅛ of an inch thick. Frame members 66 may be constructed of 6061 T6 aluminum. Welded to two of the frame members 66 may be angle plate 68. Each of three frame members 66 along with angle plate 68 form frame 64 which supports base/mounting plate assembly 90.

Mounting plate assembly 90 includes base plate 44, adjustment rods 94, lock nuts 96, mounting screw 98, and mounting knob 100. Base plate 44 may be generally in the shape of a disk with mounting screw 98 protruding from the top face of base plate 44. Mounting screw 98 may be a ⅝-11 UNC threaded screw configured to screw into the base of a theodolite or other optical instrument. Base plate 44 may be composed of ¾ inch thick 6061 T6 aluminum. At the opposite end of mounting screw 98 may be mounting knob 100. Mounting knob 100 may be a knurled knob that allows for hand tightening of mounting screw 98 into the base of a theodolite. Mounting knob 100 may be knurled or coated, or configured with other features known in the art to allow better gripping without slippage.

Extending from the underside of base plate 44 may be three adjustment rods 94. Adjustment rods 94 may extend from base plate 44 through frame members 66 at three places. Each adjustment knob 94 may be secured to its respective frame member 66 with two lock nuts 96. One lock nut being positioned at the top portion of frame member 66 and the other lock nut being positioned on the bottom of frame member 66. Adjustment rods 94 may allow vertical adjustability of base plate 44 at three different locations around the circumference of base plate 44. Such adjustability may permit base plate 44 to be accurately positioned at a precise height above frame 64. The position of clamp assembly 42 on vertical backstructure tube 62 together with the height adjustment of base plate 44 may allow the eyepiece, lens, and line of sight of a mounted theodolite to be located sixty inches above the reflector tip of a radar antenna. Moreover, base plate 44 may be made to be accurately level by separately adjusting each adjustment rod 94. Adjustment rods 94 may be ½-13 threaded rods.

Clamp assembly 42 may be welded to angle plate 68. Angle plate 68 may be composed of ½ inch by 4½ inch flat bar 6061 T6 aluminum. The angle formed between clamp assembly 42 and frame 64 may be approximately 105 degrees. This angle may be selected such that when clamp assembly is attached to vertical backstructure tube 62, frame 64 will be approximately level. Vertical backstructure tube 62 may be approximately 15 degrees off of vertical.

Clamp assembly 42 may include clamp base 78 and clamp bracket 80. Clamp base 78 may be composed of similar aluminum tube as frame member 66. Welded to clamp base 78 may be ears 82. Ears 82 may extend from clamp base 78 and may include threaded holes sized to accept clamp rods 72. Clamp ears 82 may be composed of ¾ inch by 2 inch flat bar 6061 T6 aluminum.

Clamp rods 72 may be attached to clamp knobs 74. Clamp knobs 74 may be configured to be easily turned by hand to apply a clamping force to clamp bracket 80 that will in turn clamp theodolite support tool 12 to vertical backstructure tube 62. The surfaces of clamp base 78 and clamp bracket 80 may be covered by protective pads 84. Protective pads 84 may be screwed into the contact surfaces of clamp base 88 and clamp bracket 80. Protective pads 84 may be composed of ¼ by 2 inch Delrin® plastic available from DuPont® or other suitable material that is capable of protecting vertical backstructure tube 62 when a clamping force is applied.

Clamp assembly 42 may also include clamp sides 76. Four clamp sides 76 may ensure proper positioning of clamp assembly 42 to vertical backstructure tube 62. Each clamp side may be composed of 3/16 inch by 1½ inch flat bar 6061 T6 aluminum.

Figure 3:
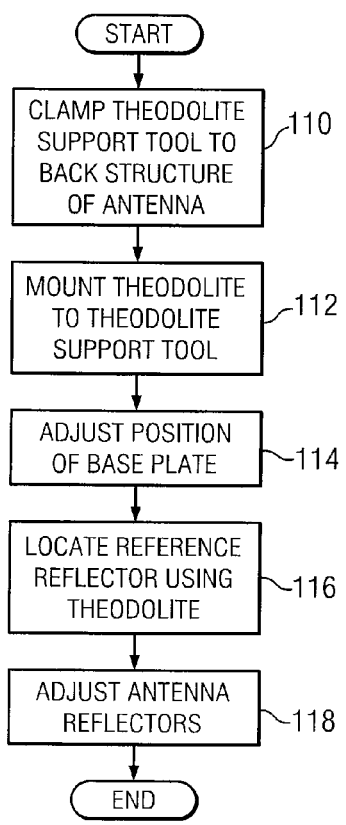
FIG. 3 is a flowchart illustrating a method for calibrating an antenna using a theodolite support tool in accordance with a particular embodiment of the present invention.

FIG. 3 is a flowchart illustrating a method for calibrating radar antenna 10 in accordance with a particular embodiment of the present invention. Calibration may be performed in connection with the installation of a new radar system or may be performed as maintenance of existing systems.

The method begins at step 110 where theodolite support tool 12 in accordance with particular embodiments of the present invention is clamped to backstructure 36 of an antenna 10 to be calibrated. The theodolite support tool 12 may be clamped to a vertical backstructure tube 38 of the antenna backstructure 36. It may be clamped at a predetermined height that will allow a horizontal line of sight of theodolite 14 to be approximately 60 inches, in one embodiment, above reflector tip 34 of the antenna's reflector 32. At step 112 theodolite 14 is mounted to the theodolite support tool 12. The theodolite may rest on the base plate 44 of theodolite support tool 12 and may be secured to the base by a mounting screw.

The position of base plate 44 may be adjusted at step 114. Base plate 44 may be adjusted to be a precise height above the frame of theodolite support tool 12 in order that the line of sight of theodolite 14 is approximately sixty inches above reflector tip 34 of the antenna's reflector. In addition, base plate 44 may be leveled. Leveling base plate 44 may be accomplished by separately adjusting the height of one or more of three adjustment rods extending from base plate 44.

Once the line of sight of theodolite 14 is in the proper position and theodolite 14 is properly leveled, a reference reflector 16 may be located using the theodolite at step 116. A surveyor looking through the optical component of the theodolite may direct a remote reference reflector installation crew to position reference reflector 16 at a correct height. As shown in FIG. 1A, reference reflector 16 may be located at 0.8 or 0.9 degrees above the true horizon 18 as measured by the properly positioned theodolite 14. With reference reflector 16 in the proper position and at the proper elevation, antenna 10 may be rotated upon its base 50 from a position where theodolite 14 attached to the backstructure 36 has an unimpeded line of site to reference reflector 16 to a position where the antenna reflector 32 has an unimpeded line of site to the reference reflector 16. At this position, reference reflector 16 may be used as a target for antenna 10 and the antenna's reflectors may be adjusted accordingly at step 118.

Adjusting the reflectors of antenna 10 may be referred to as bore siting. When antenna 10 is bore sited, a bore site scope is positioned on antenna 10 with a line of site that extends through antenna reflector 32. Fine adjustments to antenna 10 may be made by adjusting one or more of four jacking screws at the base of antenna 10. Adjustments may be made to the allow the bore site scope to align with the properly positioned reference reflector 16. The perpendicularity and/or curvature of antenna reflector 16 may also be adjusted.

With the reflectors properly positioned a flight check on the radar system may be performed. Antenna 10 may be flight checked by creating operational conditions and determining if the radar system can locate a landing aircraft.

Once theodolite 14 has performed its function, theodolite support tool 12 may be unclamped and removed from the backstructure 36 of antenna 10 if desired.

Some of the steps illustrated in FIG. 3 may be combined, modified, or deleted where appropriate, and additional steps may also be added to the flowchart. Additionally, steps may be performed in any suitable order without departing from the scope of the invention.

Figure 4:
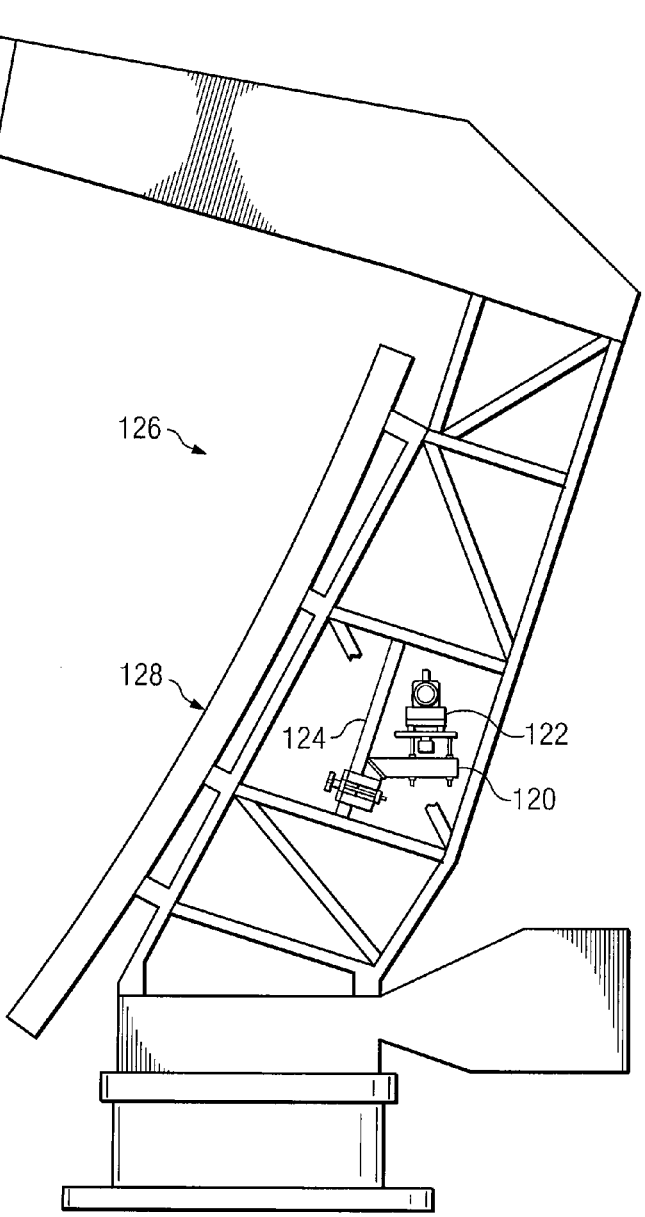
FIG. 4 illustrates the positioning of a theodolite support tool in accordance with a particular embodiment of the present invention.

An alternate embodiment of the present invention is illustrated in FIG. 4. In certain applications of calibration of radar antennas, it may be desirable to position a theodolite as close as possible to the center axis of the antenna. Utilizing the theodolite support tool 120 with the mounted theodolite 122, it may be possible to mount the theodolite support tool to an internal vertical member 124 of the antenna backstructure. By mounting to internal vertical support tube 124 in the center of the backstructure, it may be possible to find a line of sight of the theodolite that goes through the antenna backstructure. Such a configuration of a theodolite so close to the actual operational position of reflectors 128 of antenna 126 would not be possible using conventional tripod techniques. Additional accuracy and precision in locating a reference reflector at a particular position relative to the antenna may be possible using this particular embodiment of the present invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a theodolite support tool and method for calibrating a radar antenna, these elements may be combined, rearranged, or positioned in order to accommodate particular manufacturing or operational needs.

Numerous other changes, substitutions, variations, alterations, and modifications may be ascertained by those skilled in the art as intended that the present invention encompass all such changes, substitutions, variations, alterations, and modifications as falling within the spirit and scope of the appended claims. Moreover, the present invention is not intended to be limited in any way by any statement in the specification that is otherwise reflected in the claims.

What is claimed is:

1. A theodolite support tool, comprising:
   a base plate configured to couple to a theodolite and having at least three rods extending from a bottom side of the base plate, each respective rod being vertically adjustable;
   a clamp configured to attach to a support of an antenna; and
   a cantilevered frame supporting the base plate and being coupled to the clamp such that the frame is approximately level when the clamp is attached to the support of the antenna that is a predetermined angle from vertical.

2. The theodolite support tool of claim 1, wherein the base plate further comprises a threaded mounting screw configured to couple to the theodolite.

3. The theodolite support tool of claim 1, further comprising a protective pad coupled to the clamp.

4. The theodolite support tool of claim 1, wherein the base plate, the clamp, and the cantilevered frame comprise aluminum.

5. The theodolite support tool of claim 1, wherein the predetermined angle from vertical is approximately fifteen degrees.

6. The theodolite support tool of claim 1, wherein the clamp further comprises a plurality of threaded clamping rods configured to be rotated to apply a clamping force to the support of the antenna.

7. A method for positioning a theodolite, comprising:
clamping a theodolite support tool to a support of an antenna, the theodolite support tool comprising a base plate having at least three rods extending from a bottom side of the base plate, each respective rod being vertically adjustable, a clamp configured to attach to the support of the antenna, and a cantilevered frame supporting the base plate and being coupled to the clamp;
securing a theodolite to the base plate of the theodolite support tool; and
adjusting the position of the base plate of the theodolite support tool.

8. The method of claim 7, wherein clamping the theodolite support tool and adjusting the position of the base allows a lens of the theodolite to be a predetermined height above a reflector tip of the antenna.

9. The method of claim 8, wherein the predetermined height is sixty inches.

10. The method of claim 7, wherein the support of the antenna is a predetermined angle away from vertical.

11. The method of claim 10, wherein the predetermined angle is approximately equal to fifteen degrees.

12. A method comprising:
mounting a theodolite support tool having a vertically adjustable base plate to an antenna;
adjusting a height of the theodolite support tool and the vertically adjustable base plate such that a horizontal line of sight of a theodolite is a predetermined height above a reflector tip of the antenna;
positioning a target reflector using the theodolite; and
adjusting an antenna reflector of the antenna.

13. The method of claim 12, wherein the vertically adjustable base plate comprises at least three rods extending from a bottom side of the vertically adjustable base plate, each respective rod being vertically adjustable.

14. The method of claim 13, wherein the theodolite support tool further comprises a clamp configured to attach to the support of the antenna, and a cantilevered frame coupled to the clamp and supporting the vertically adjustable base plate.

15. The method of claim 12, wherein the horizontal line of sight of the theodolite being a predetermined height above the reflector tip of the antenna eliminates a vertical offset calculation.

16. The method of claim 12, wherein the predetermined height above the reflector tip is sixty inches.

17. The method of claim 12, further comprising rotating the antenna from a first position where the theodolite has a direct line of sight to the target reflector to a second position where the antenna reflector has a direct line of sight to the target reflector.

18. The method of claim 12, further comprising bore siting the antenna.

19. The method of claim 18, further comprising flight checking the antenna.

20. The method of claim 12, wherein an imaginary line from the theodolite to the target reflector is 0.8 or 0.9 degrees above a true horizon.

21. The method of claim 12, wherein mounting the theodolite support tool comprises mounting the theodolite support tool to an interior support of the antenna such that an imaginary horizontal line through a lens of the theodolite extends through a backstructure of the antenna.

* * * * *